United States Patent [19]

Ikeda

[11] Patent Number: 4,701,908
[45] Date of Patent: Oct. 20, 1987

[54] NETWORK SYSTEM UTILIZING PLURAL STATION ADDRESSES

[75] Inventor: Toshio Ikeda, Yokohama, Japan

[73] Assignee: Canon Kabushiki Kaisha, Tokyo, Japan

[21] Appl. No.: 742,906

[22] Filed: Jun. 10, 1985

[30] Foreign Application Priority Data

Jun. 22, 1984 [JP] Japan ................................ 59/127269
Jun. 22, 1984 [JP] Japan ................................ 59/127272

[51] Int. Cl.⁴ ............................ H08J 3/00; H04J 3/16
[52] U.S. Cl. ....................................... 370/85; 370/89; 340/825.52
[58] Field of Search ....................... 370/85, 86, 89, 90; 340/825.07, 825.08, 825.5, 825.52

[56] References Cited

U.S. PATENT DOCUMENTS

| | | | |
|---|---|---|---|
| 3,790,717 | 2/1974 | Abramson et al. | 370/90 |
| 4,404,557 | 9/1983 | Grow | 370/86 |
| 4,551,721 | 11/1985 | Kozlik | 370/85 |
| 4,553,234 | 11/1985 | Brandsma et al. | 370/86 |
| 4,583,088 | 4/1986 | Bux et al. | 370/86 |

*Primary Examiner*—Douglas W. Olms
*Assistant Examiner*—Frank M. Scutch, III
*Attorney, Agent, or Firm*—Fitzpatrick, Cella, Harper & Scinto

[57] ABSTRACT

There is disclosed a communication network system in which the token or communication right is transferred among plural stations. In this system the different stations have different frequencies of receiving the token, and this is achieved by the fact that certain stations have plural addresses.

14 Claims, 17 Drawing Figures

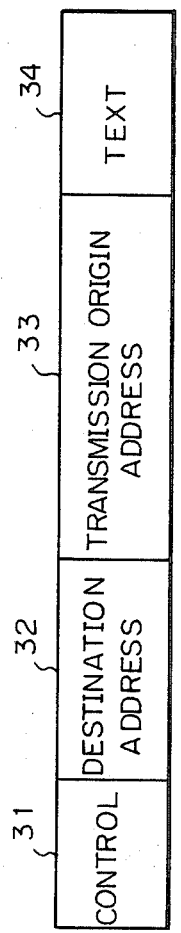
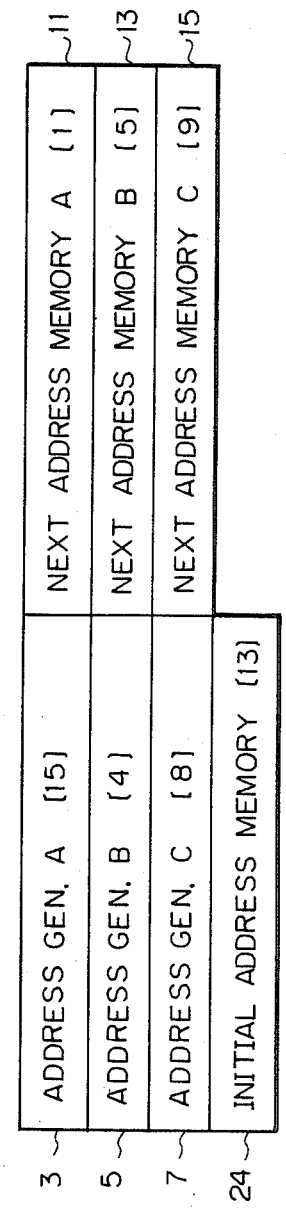

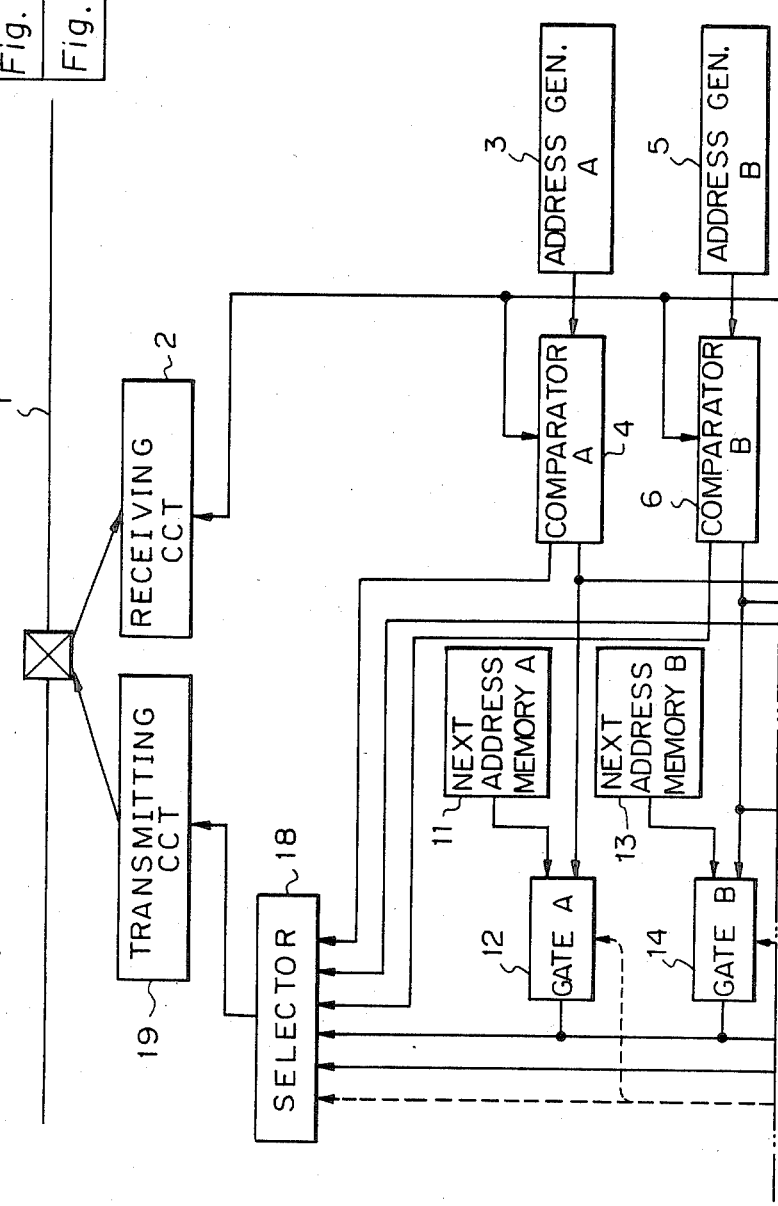

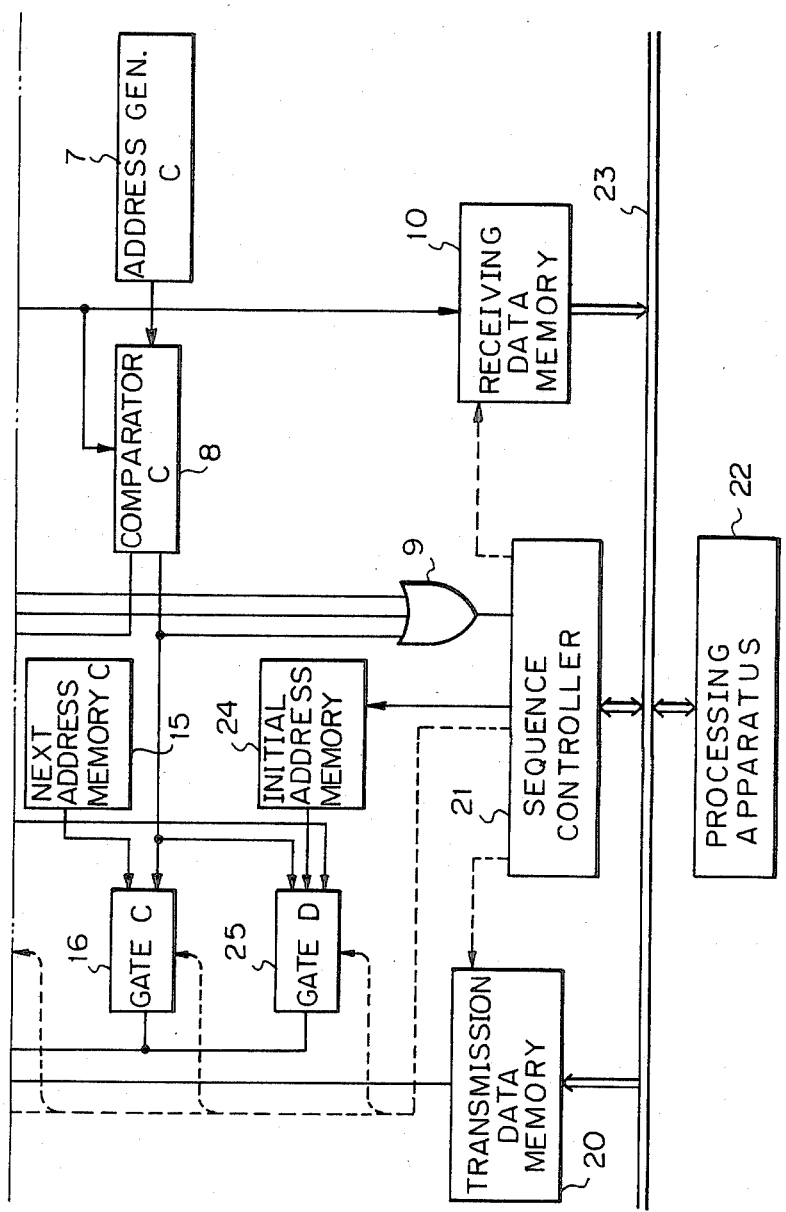

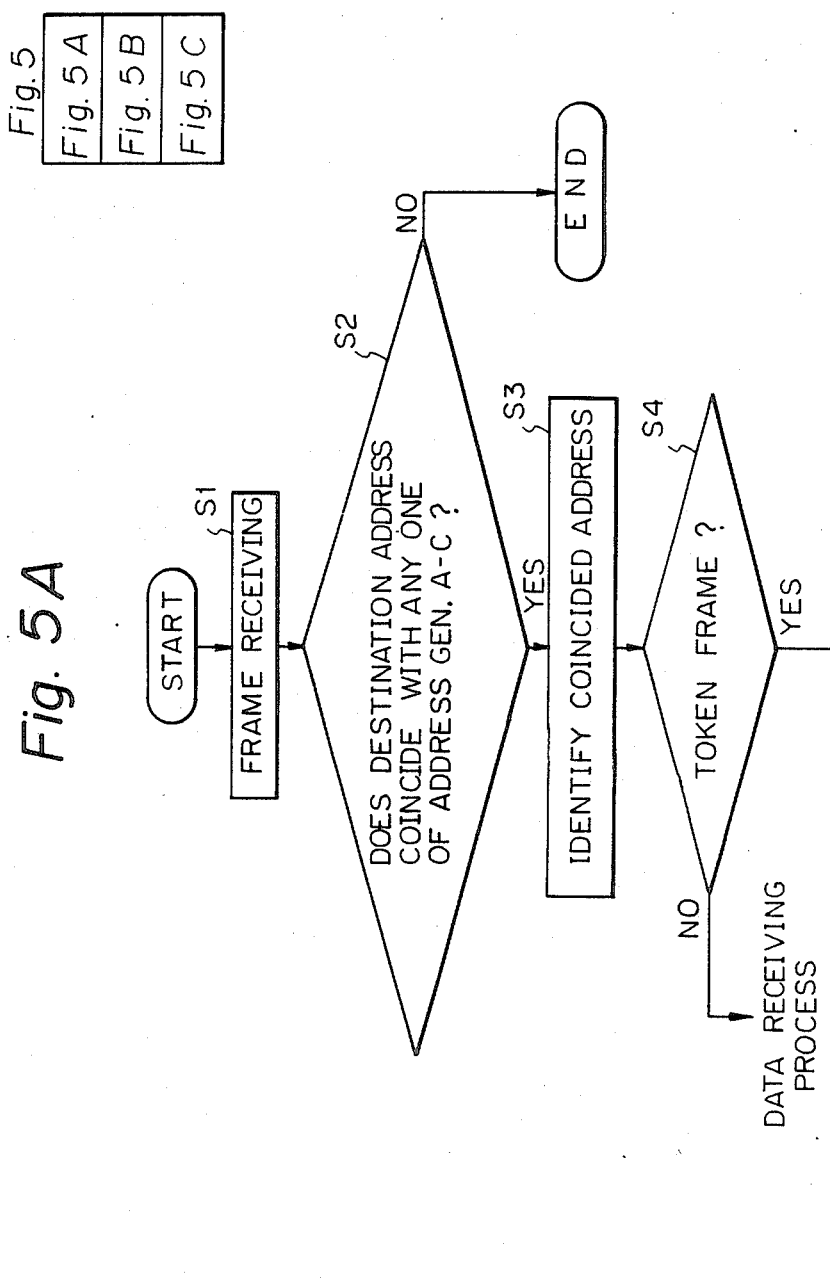

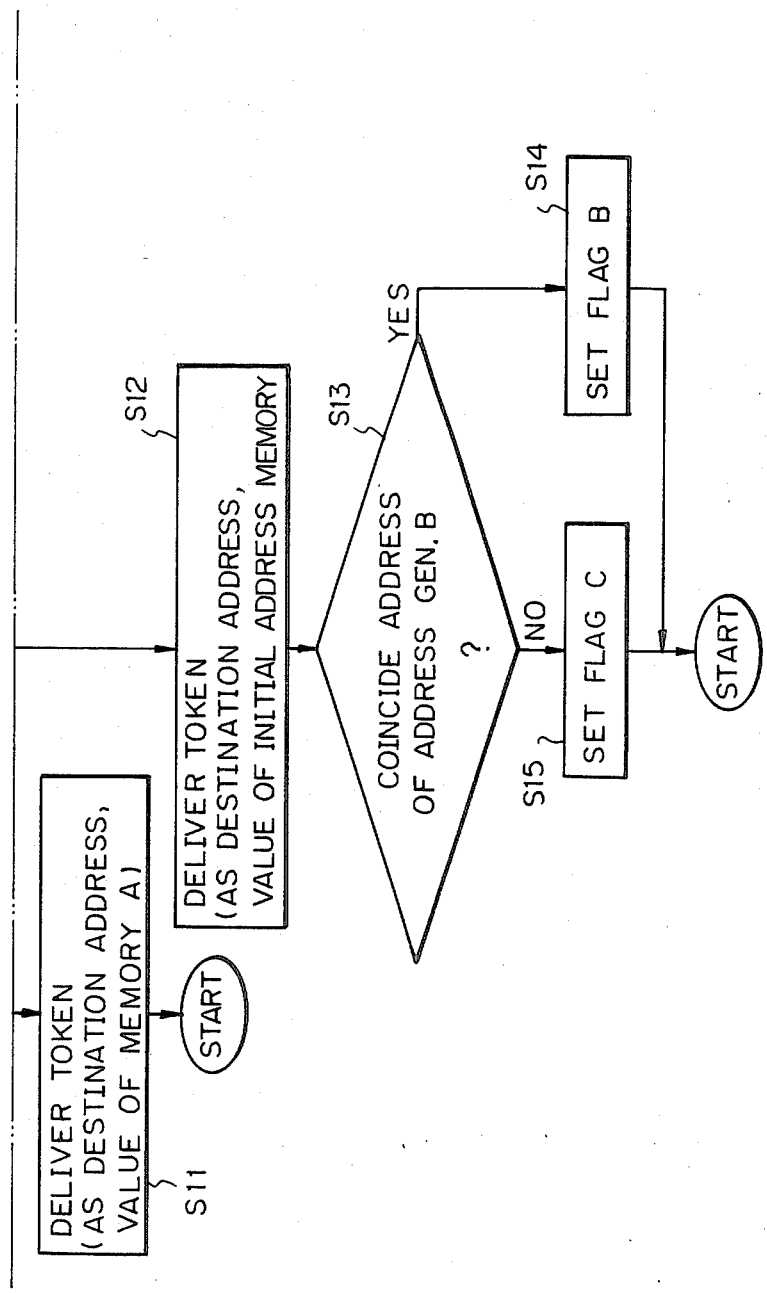

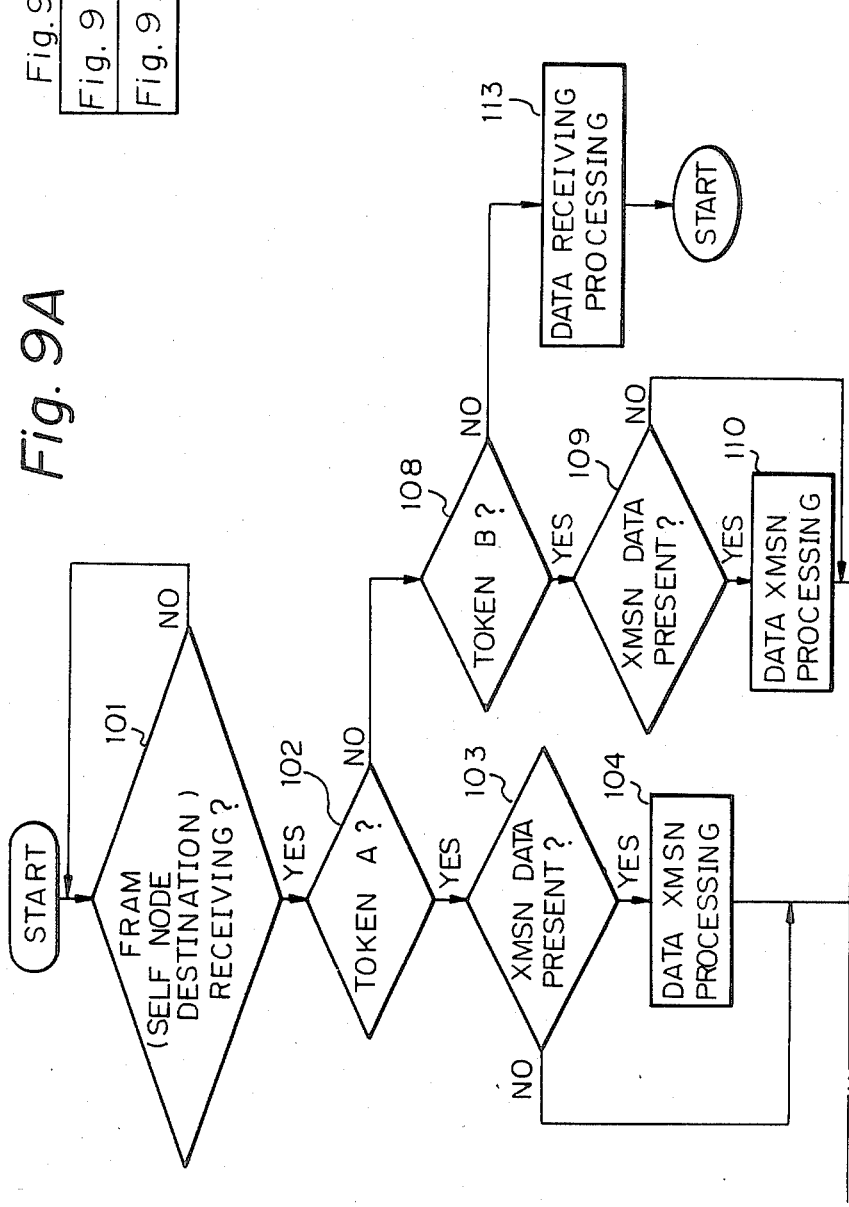

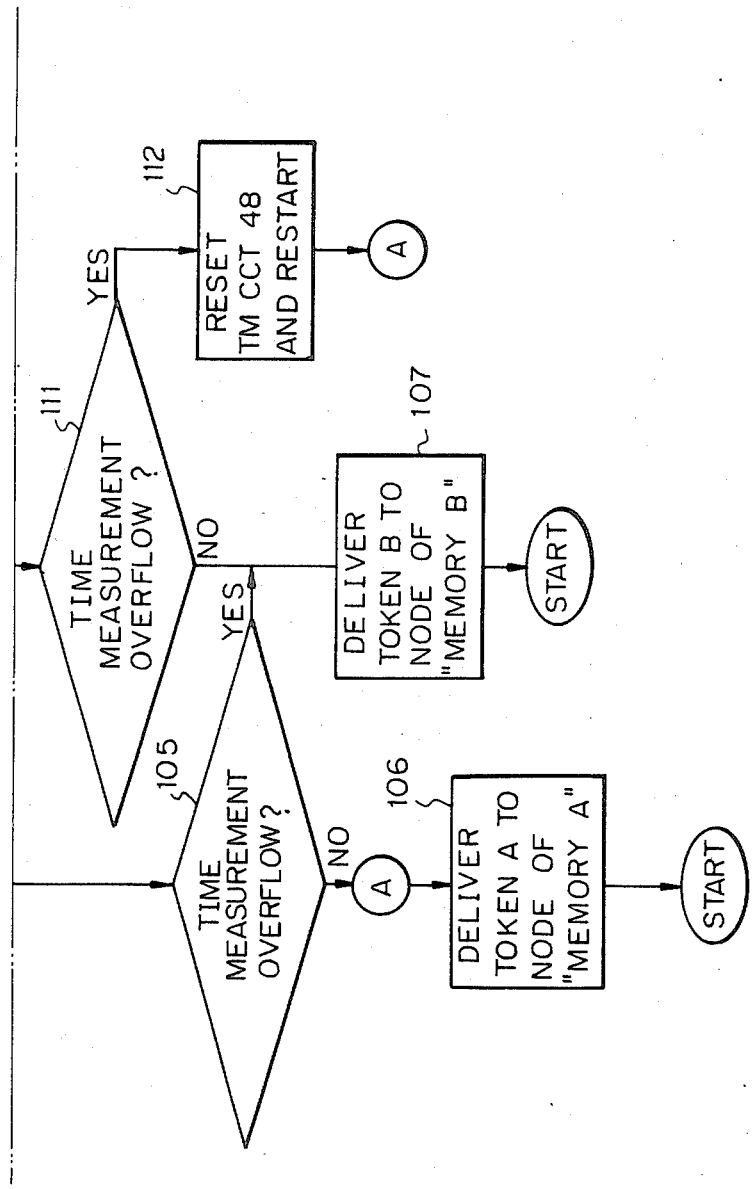

NETWORK SYSTEM UTILIZING PLURAL STATION ADDRESSES

BACKGROUND OF THE INVENTION

1. Field of the Invention

The present invention relates to a data communication control system for a network system composed of plural communication stations connected to a communication medium, and more particularly to such system with a token passing method in which the right of communication is shared in time by circulating the destination address of the token in the order of logic addresses.

2. Description of the Prior Art

In a data transmission system with a conventional token passing method, efficient and well-balanced communication without collision of data on the transmission channel is achieved by circulating a token, representing a command for transferring the right of communication, through all the stations connected to the network, and giving the right of communication to a station which has received the token.

In such a conventional method, however, the token is always circulated in a predetermined order though the stations connected to the transmission channel may have respectively different frequencies of requesting the use of the transmission channel.

For example, a work station, provided with a keyboard, a display unit etc. for processing data, such as image information, by an operator, has a relatively limited frequency of requesting the use of the transmission channel because of the nature of function of such station, but a station commonly utilized by plural stations connected to the transmission channel, such as a file server used as a memory unit for various data, has a higher frequency of access, thus involving a much higher frequency of requesting the use of the transmission channel. Still the token is circulated to all the stations equally, so that the requests for the use of the transmission channel cannot be satisfactorily fulfilled. For this reason, in order to fully exploit the performance of such a commonly utilized station, it has been proposed to increase the signal transfer rate itself, but such an increase of the transfer rate has a limit and inevitably gives rise to a significant increase in the cost of all the stations connected to the transmission channel.

SUMMARY OF THE INVENTION

In consideration of the foregoing, an object of the present invention is to provide a network system with a satisfactory efficiency of communication.

Another object of the present invention is to provide a network system allowing to increase the frequency of acquisition of the right of communication at least for a particular communication station in the system.

Still another object of the present invention is to provide a network system which allows modification of the network structure, without changing the phsical structure of the transmission medium of the network system.

Still another object of the present invention is to provide a network system enabling efficient data transmission according to the state of utilization of the network.

Still another object of the present invention is to provide a network system adapted for use as a so-called local area network for data communication in a limited area such as a factory site or a building.

The foregoing and still other objects of the present invention, and the advantages thereof, will become fully apparent from the following description.

BRIEF DESCRIPTION OF THE DRAWINGS

FIG. 2 is a chart showing a data transmission format to be employed in the network system of said embodiment;

FIG. 3 is an assembly diagram of a block diagram comprising FIGS. 3A and 3B of a gateway station or a master node in the network system of the embodiment shown in FIG. 1;

FIG. 4 is a chart showing the content of address generators, next address memories and an initial address memory shown in FIGS. 3A and 3B;

FIG. 9 is as assembly diagram of a flow chart comprising FIGS. 9A and 9B showing the procedure of data transmission control in the communication station shown in FIG. 8.

DETAILED DESCRIPTION OF THE PREFERRED EMBODIMENTS

Now the present invention will be described in detail by embodiments thereof shown in the attached drawings.

Figure 1:
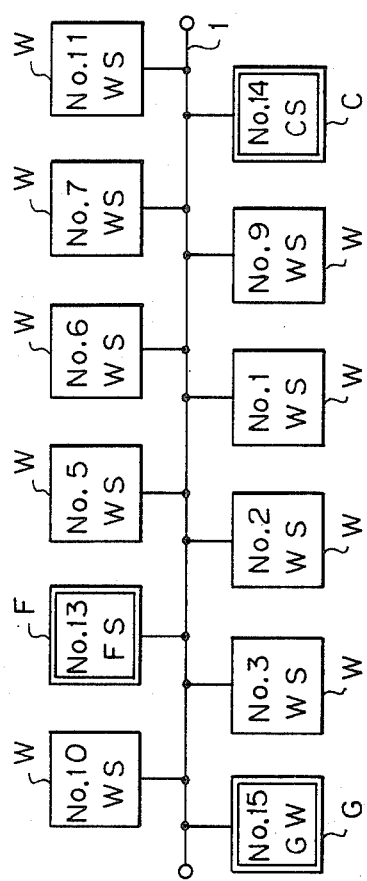
FIG. 1 is a schematic view of a network system embodying the present invention.

In FIG. 1 there are shown a transmission channel 1 constituting a bus-type communication medium; work stations W (WS), each equipped with a keyboard and a display unit for information processing by an operator; a file server F (FS) for storage of information received for the transmission channel and for supply of information to the transmission channel; a communication server C (CS) with an interface function for the transmission of information from the network system to another computer or the like; and a gateway station G (GW) used for connection with another local area network and constituting a master node for controlling the entire network system. The stations or nodes FS, CS and GW are often used commonly by plural stations.

The number in each station indicates the node address number thereof.

FIG. 2 shows a data frame format to be employed in the network system of the present embodiment, including a control area 31 indicating the content of the data frame and constituting a token control area in case the data frame is a token frame; a destination address 32 of said data frame; a sender address 33 indicating the origin of transmission; and a text 34 indicating a data area, which is deleted if unnecessary, for example in case of merely sending a token without data.

FIGS. 3A and 3B illustrate a block diagram of a master node corresponding to the gateway unit G of the embodiment shown in FIG. 1, wherein shown are a transmission channel 1; a receiving circuit 2 for converting the level of the transmission channel 1 to separate the clock signals from the data; address generators A-C 3, 5, 7 for generating their own addresses; comparators A-C 4, 6, 8 for comparing the addresses generated by the address generators A-C (3, 5, 7) with the destination address of the data frame received by the receiving circuit 2; a logic or circuit 9 for transmitting coincidence signals obtained by the comparison in the comparators A-C (4, 6, 8) to a sequence controller 21; a received data memory 10 for storing received data; next address memories A-C 11, 13, 15 storing the destination addresses of downstream nodes to which the token is to be transferred after a process execution for a token addressed to this node in response to a coincidence signal from the comparators A-C (4, 6, 8); and gate circuits A-C 12, 14, 16 for transmitting the output signal of the next address memories A-C (11, 13, 15) to a selector 18 in response to the coincidence signal of the comparator A-C (4, 6, 8).

There are further shown a selector 18 for selectively releasing the next address from the gates A-D (12, 14, 16, 24), transmission data from a transmission data memory 20 and own address data from the address generators A-C (3, 5, 7); a transmitting circuit 19 for transmitting a data frame generated by the selector 18 to the transmission channel 1; a transmission data memory 20 for temporarily storing the data to be transmitted; a sequence controller 21 for controlling the functions of the above-described units 2-20 according to a determined procedure; a processing unit 22 consisting of a microcomputer, a ROM, a RAM etc. for processing the contents of the received data memory 10 and of the transmission data memory 20 and administering the sequence controller 21; a bus line 23 for information exchange with the processing unit 22; an initial address memory 24 storing the initial address of an address group of a particular station; and a gate D 25 for transmitting the output signal of the initial address memory.

The addresses of said address generators A-C, next address memories A-C and initial address memory are arbitrarily changeable according to the state of utilization of the network system.

FIG. 4 shows an example of the contents of the address generators 3, 5, 7, next address generators 11, 13, 15 and initial address memory 24. The initial address memory stores an address to which the token is frequently transferred, while the next address memories A, B, C respectively store downstream addresses of the addresses stored in the address generators A, B, C.

In FIG. 4, the parenthesized figures are addresses corresponding to the nodes shown in FIG. 1.

Figure 5B:
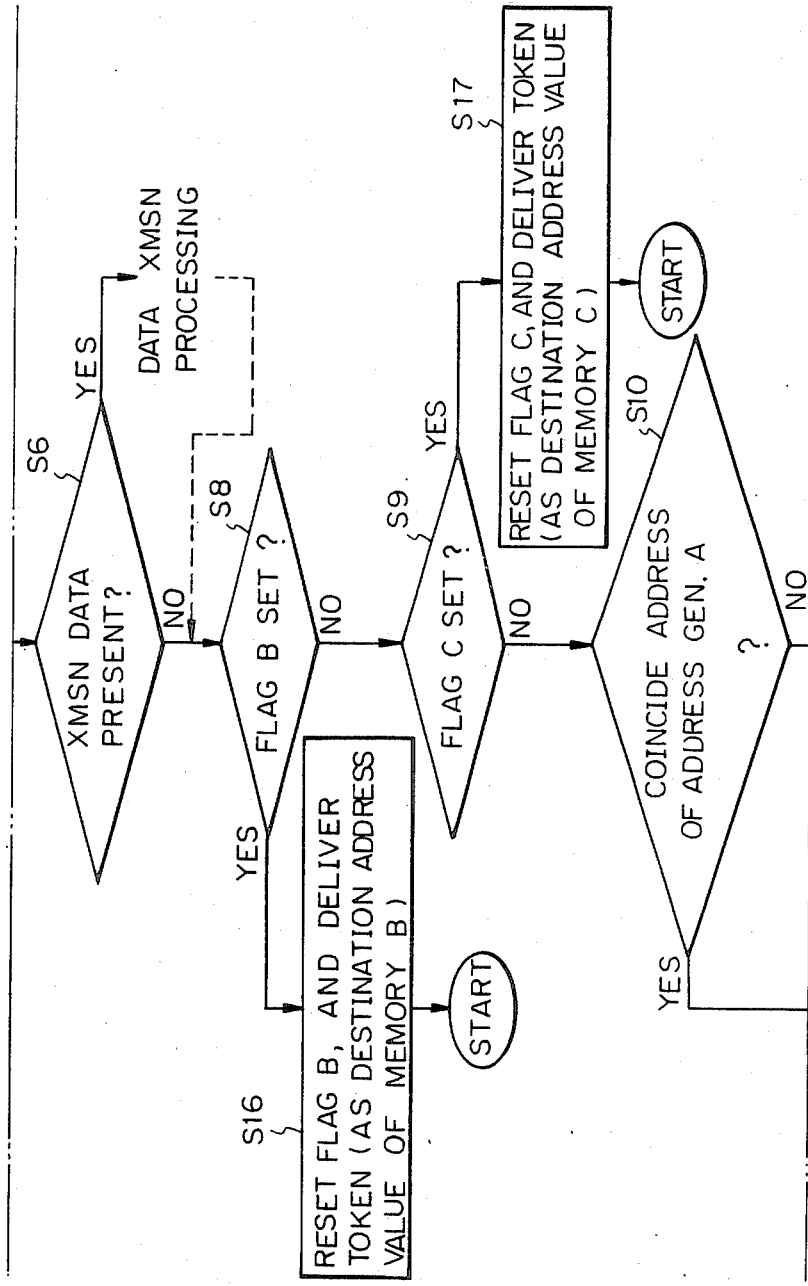
FIG. 5 is an assembly diagram of a flow chart comprising FIGS. 5A, 5B and 5C showing the procedure of transmission control of the gateway unit shown in FIGS. 3A and 3B.

Now reference is made to a flow chart shown in FIGS. 5A, 5B and 5C for explaining the transmission control of the network system of the present embodiment.

When a transmission data frame is supplied to the transmission channel 1, the sequence controller 21 receives said transmission frame through the receiving circuit 2 in a step S1, and causes the comparators A-C (4, 6, 8), in a step 82, to identify whether the destination address 32 of the transmission frame coincides with one of the addresses generated by the address generators A-C (3, 5, 7). In the absence of a coinciding address, indicating that said transmission frame is addressed to another node, the procedure is terminated and a next transmission frame is awaited. On the other hand, in the case of a coinciding address, the program proceeds to a step S3, wherein one of the comparators A-C (4, 6, 8) which has detected coincidence latches the result of coincidence, and supplies a coincidence signal, which is acknowledged in the step S3 by the sequence controller 21 through the logic sum circuit 9.

In response to said coincidence signal, the sequence controller 21 inspects the control area 31 of the received frame in a step S4 to identify whether said frame is a token frame, and, if said frame is not a token frame but a data transmission frame, the program proceeds to a step S5 in which the text 34 of the received frame is stored in the received data memory 10 and processed in the processing unit 22.

In case a token frame is identified in the step S4, the program proceeds to a step S6 to identify the presence of a request for transmission. In the presence of a request for transmission, the program proceeds to a step S7 in which transmission data is stored in the transmission data memory 20 in a frame formal shown in FIG. 2 and is supplied to the transmission channel 1 through the selector 18 and the transmitting circuit 19. After the completion of the data transmission, the program proceeds to a step S8.

In the absence of the request for transmission in the step S6, there is also executed the transmission of a token to a downstream node starting from the step S8.

At first the step S8 identifies whether an unrepresented flag B is set, and, if not, there is then executed a step S9 for identifying whether a flag C is set. If said flag C is not set, a step S10 identifies whether the address of the address generator A 3 coincides with the destination address of the received data frame, and, if affirmative, a step S11 transmits the token through the transmitting circuit 19 with the value of the next address memory A 11 as the destination address. In this manner the token is transferred to a node having an address immediately following the address of the address generator A 3. Subsequently the program returns to the step S1 to await the reception of a next data frame.

In case the address of the address generator A 3 does not coincide with the destination address of the received data address in the step S10, the program proceeds to a step S12 for transmitting the token with the value of the initial address memory 24 as the destination address. Subsequently a step S13 identifies whether the destination address of the received data frame coincides with the address value of the address generator B 5, and, if affirmative, the flag B is set in a step S14 and the program returns to the step S1.

In case the destination address of the received data frame is not equal to the value of the address generator B 5 in the step S13, namely when said destination address coincides with the value of the address generator C 7, the flag C is set in a step S15 and the program returns to the step S1.

In case the set state of the flag is identified in the step S8, the program proceeds to a step S16 for resetting the flag B and transmitting the token with the value of the next address memory B as the destination address. In this manner the token is transferred to a node with an address immediately next to the address in the address generator B, and the program returns to the step S1.

In case the set state of the flag C is identified in the step S9, the program proceeds to a step S17 for resetting the flag C and transmitting the token with the value of the next address memory C as the destination address. In this manner the token is transferred to a node with an address immediately next to the address of the address generator C.

As explained in the foregoing, when the destination address of the first received token frame coincides with the address of the address generator B 3 or C 5, the token is transmitted with the value of the initial address memory 24 as the destination address, instead of the value of the next address memory B 13 or C 15 and a corresponding flag B or C is set, and a next address memory corresponding to the set flag is rendered effective when the right of communication is acquired next time. In this manner the right of communication can be given more frequently to the commonly utilized nodes such as the file server FS, communication server CS, gateway station GW etc. by allotting the addresses downstream to the value of the initial address memory 24.

Figure 6:
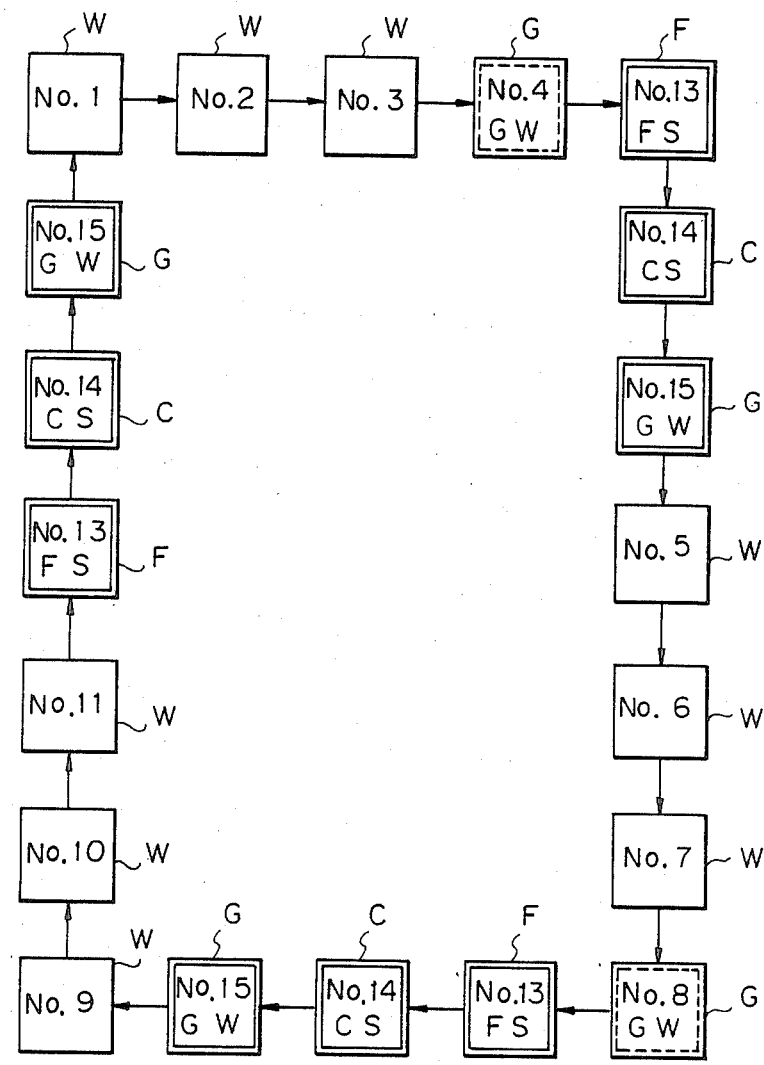
FIG. 6 is a view of a logic ring for circulating the token in the network system of said embodiment.

FIG. 6 shows an example of the logic ring structure for token circulation in the network system of the present embodiment. It will be understood that the token is delivered plural times to the commonly utilized nodes GW, FS, CS etc. while the token is circulated to all the stations. The sequence of circulation can be easily altered by changing the addresses set in the address generators.

As explained in the foregoing, a particular station or node can acquire, by allotting plural addresses thereto, the right of communication plural times during a circulation of the token through the logic ring, and efficient data transmission control is achieved by allotting the destination addresses to the token in such a manner that communication stations having higher frequencies of transmission requests can receive the token plural times.

In the foregoing embodiment the frequently utilized nodes can receive the token plural times during a circulation of the token through all the nodes, whereby desired nodes, for example the frequently utilized nodes can have more opportunities for data communication.

In the following there will be explained another embodiment for increasing the opportunities of data communication for a desired node.

Figure 7:
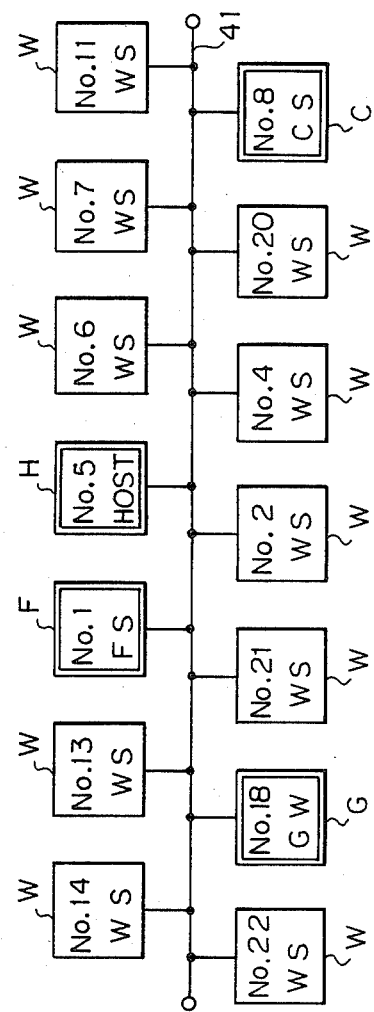
FIG. 7 is a schematic view of a network system showing another embodiment of the present invention.

FIG. 7 shows another embodiment of a bus-shaped network system of the present invention, wherein shown are a transmission channel 41; work stations W; a file server F; a host computer HOST; a communication server C; and a gateway station G for connection with another local area network. The figure in each node is the own node address thereof.

Also in the network system shown in FIG. 7, the transmission frame of a format as shown in FIG. 2 is employed for data communication.

Figure 8:
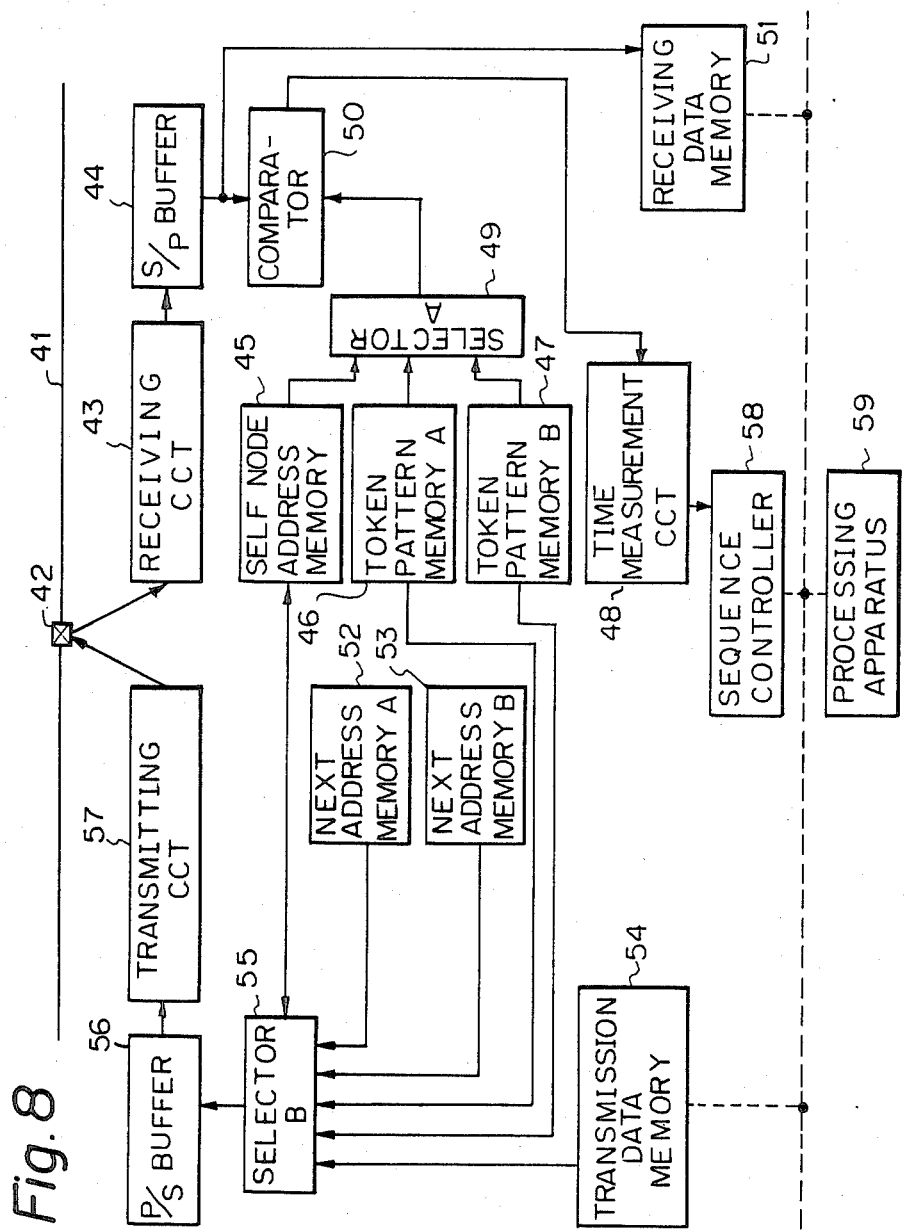
FIG. 8 is a block diagram of a communication station connected to the network system shown in FIG. 7.

FIG. 8 is a block diagram of a transmission station (hereinafter called node) connected to the network system shown in FIG. 7, for example the gateway station, having frequent requests for data transmission. In FIG. 8 there are shown a transmission channel 41 shown in FIG. 7; a connector for connecting the node with the transmission channel 41; a receiving circuit 43 for converting the level of the signals from the transmission channel 41 and separating the data from the clock signals; a serial-to-parallel (S/P) buffer 44 for the data serially supplied from the receiving circuit 43 into parallel data; an own address memory 45 for storing its own address; a token pattern memory A 46 for storing a first token pattern; a token pattern memory B 47 for storing a second token pattern different from the first; a timer circuit 48 for determining the timing for switching the transmission token pattern; a selector A 49 for selecting either the own address memory 45 or the token pattern memory A 46 or the token pattern memory B 47; a comparator 50 for comparing the value of the S/P buffer 44 with the value selected by the selector 49; a received data memory 51 connected to the S/P buffer 44 and storing the received data; a next address memory A 52 storing a destination address of a node to which the token pattern "A" stored in the token pattern memory A 46 is to be transferred; a next address memory B 53 storing a destination address of a node to which the token pattern "B" stored in the token pattern memory B 47 is to be transferred; a transmission data memory 54 for storing data to be transmitted; a selector B 55 for selecting data from the next address memory A 52, next address memory B 53, token pattern memory A 46, token pattern memory B 47 and transmission data memory 54 to generate a transmission data frame; a parallel-to-serial (P/S) buffer 56 for converting the parallel data supplied from the selector 55 into serial data; a transmitting circuit 57 for modulation and level conversion of the data and clock signals from the P/S buffer 56 for transmitting to the transmission channel 41; and a sequence controller 58 for controlling the above-mentioned various units. For the purpose of clarity, FIG. 8 only shows the flow of data and omits the control lines from the sequence controller for controlling various units.

A processing unit 59 processes the content of the received data memory 51 or transmission data memory 54, and administers the sequence controller 58.

Now reference is made to a flow chart shown in FIGS. 9A and 9B for explaining the transmission control in the above-described node.

A data frame on the transmission channel 41 is received by and stored in the S/P buffer 44 through the connector 42 and receiving circuit 43. At first in a step 101, the selector A 49 selects the own address memory 45, and the comparator 50 compares the destination address 32 of the received frame in the S/P buffer 44 with the own address. In the absence of coincidence, the received frame which is addressed to another node is disregarded, and another frame is awaited.

In case the result of comparison indicates that said frame is addressed to this node, the program proceeds to a step 102 wherein the selector A 49 selects the token pattern memory A 46 and the comparator 50 compares the control 31 in the received frame with the token pattern A. In case of coincidence indicating that the received frame is token A, a step 103 identifies whether there is any data to be transmitted, and, if present, a step 104 executes the data transmission to a desired node. Upon completion of the data transmission, the program proceeds to a step 105.

In case there is no data to be transmitted in the step 103, the program proceeds to the step 105. Said step 105 identifies whether the time measured by the timer circuit 48 exceeds a determined value, and, if not, a step 106 causes the selector B 55 to select the next address memory 52 and the token pattern memory A 46, and transmits the thus formed token A frame to the transmission channel 41 through the P/S buffer 56 and the transmitting circuit 57, thus transferring the right of communication to another node. Then the program returns to the step 101 to await a frame addressed to this node.

After the transmission for a determined period to a node indicated by the token A and the next address memory A corresponding to said token A, the timer circuit reaches the determined time whereby the program proceeds from the step 105 to a step 107. Said step 107 causes the selector B 55 to select the next address memory B 53 and the token pattern memory B 46 to transmit the token B instead of the token A, and the program returns to the step 101. After the timer circuit 48 overflows, it is retained in this state until it is reset.

On the other hand, in case the step 102 identifies that the control 31 of the received frame does not correspond to the pattern of the token pattern memory A, the program proceeds to a step 108 in which the selector A 49 selects the token pattern memory B for comparing the control 31 of the received frame with the token pattern B. In case the two coincide each other, indicating that the received frame is a token B addressed to this node, the program proceeds to a step 109 to identify the presence of data to be transmitted as in the step 103, and, if present, a step 110 executes the data transmission. After the completion of data transmission, the program proceeds to a step 111.

In case there is no data to be transmitted in the step 109, the program also proceeds to the step 111. Said step 111 identifies whether the time measured by the timer circuit 48 exceeds a determined time, and, if affirmative, a step 112 resets and restarts the timer circuit 48, and the program proceeds to a step 106 for transmitting the token A.

In case said determined time is not exceeded in the step 111, the program proceeds to a step 107 for transmitting the token B same as the received frame.

Let us consider a case in which the host computer H, gateway unit GW, file server FS and communication server CS in the network system shown in FIG. 7 have the structure shown in FIG. 3, and that the next address memory A 52 of the gateway unit GW of an address "18" stores a value "1" while the next address memory B 53 stores a value "20". It is assumed that the timer circuit 48 is before overflowing, that, during the circulation of the token A and prior to said overflowing, the token A is addressed to the file server F in response to the reception of a token A, and that the file server F then transfers the token A to the communication server C and further to the gateway unit G.

When the timer circuit 48 expires, the token B is transmitted to the work station W of address "20" after the reception of the token A. Then, when the token A is circulated next time, the program proceeds from the step 111 to a step 112 for restarting the timer circuit 48 and transmitting the token A.

In this manner the token B is delivered to the work station of address "20" at an interval determined by the timer circuit 48.

Figure 10:
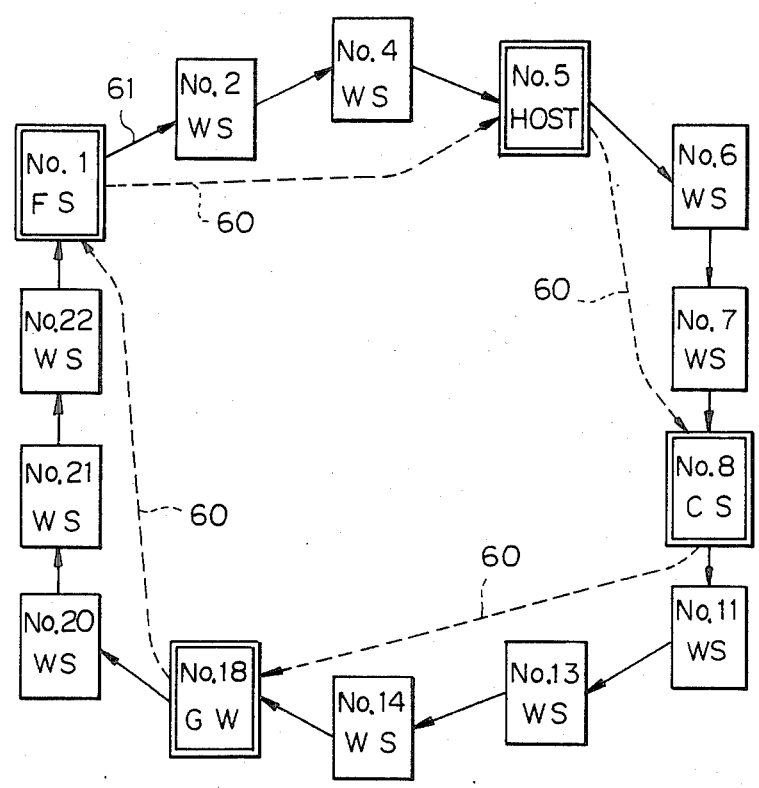
FIG. 10 is a view of a logic ring in the network system of the above-mentioned embodiment.

FIG. 10 shows the mode of circulation of two tokens through the network system, wherein the token A circulates along a broken-lined logic ring 60 while the token B circulates along a full-lined logic ring 61.

In this manner, each node frequently requesting the data transmission is provided, in the token pattern memory thereof, with two different token patterns and corresponding next address memories, and the token pattern is rendered variable by a timer circuit 48. On the other hand each node requesting the data transmission less frequently can be of conventional structure which is responsive to only one token pattern and is not provided with the next address memories and timer circuit 48.

Two logic rings shown in FIG. 10 can be realized if a master operation for switching the logic ring according to the time defined by the timer circuit 48 is executed at least by a node in the network. In such case a node with frequent requests for data transmission, for example a commonly utilized node, and with a largest address may be temporarily selected as a master node, and the timer circuits in all other nodes are reset. Though the foregoing embodiment employs two different tokens, it is furthermore possible to construct a network system capable of deliveries of the right of communication more finely adapted to the requests of data transmission, by employing a larger number of tokens through the increase of token pattern memories and next address memories.

The change of the token pattern may be effected also by the number of circulations of the token, instead of the time measurement.

As explained in the foregoing, a data transmission control process capable of highly efficient data transmission without an increase in the signal transfer rate is provided, by circulating plural tokens of different species in the network and modifying the structure of logic ring according to the specie of the token, thereby giving the right of communication more frequently to a node frequently requesting the data transmission and less frequently to a node requesting less frequently the data transmission.

The above-mentioned data transmission control process allows an increase in the relative speed, thus improving the efficiency of utilization of a node frequently requesting data transmission with an increase in the magnitude of the network system.

Though the present invention has been explained by certain preferred embodiments thereof, it is not limited to such embodiments but is subject to various modifications within the scope and spirit of the appended claims.

What is claimed is:

1. A network system including a plurality of nodes, each having an associated address, connected to each other through a communication medium, wherein only a node to which a communication right has been assigned is permitted to perform data transmission between that node and another node and the communication right is assigned by a command with a destination address to another node having an associated address coinciding with the destination address, and wherein a particular node among said plurality of nodes comprises:

means for providing a particular address different from said associated address;

means for obtaining the communication right upon receipt of the command with the destination address coinciding with one of said associated address and said particular address; and means for assigning the communication right, said assigning means being operable, in a case where said obtaining means obtained the communication right upon receipt of the command with the destination address coinciding with said particular address, to assign the communication right to a specific node, and in a case where said obtaining means obtained the communication right after assignment of the communication right to the specific node, to assign the communication right to a second node having one of an associated address and a particular address which is associated with said particular address of said specific node.

2. A network system according to claim 1, wherein said particular node transmits data prior to assignment of the communication right if a request for data transmission is present when said command is received.

3. A network system according to claim 1, wherein said particular address is variable.

4. A network system according to claim 1, wherein said assigning means includes means for storing the associated address of said specific node, and assign the communication right to a node having the stored address.

5. A network system according to claim 1, wherein said providing means includes means for storing said particular address.

6. A network system according to claim 1, wherein said plurality of nodes are bus-connected through said communication medium.

7. A network system according to claim 1, wherein said assigning means is operable, in a case where said obtaining means obtained, prior to assignment of the communication right to said specific node, the communication right upon receipt of the command with the destination address coinciding with said associated address, to assign the communication right to a node having an address which coincides with said associated address.

8. A network system according to claim 1, wherein said assigning means is operable, in a case where said obtaining means obtained the communication right after assignment of the communication right to said specific node, to assign the communication right to a node having an upstream address of said particular address.

9. A network system including a plurality of nodes, each having an associated address, connected to each other through a communication medium, wherein only a node to which a communication right has been assigned is permitted to perform data transmission between that node and another node and the communication right is assigned by a command with a destination address to another node having an associated address coinciding with the destination address, and wherein a particular node among said plurality of nodes comprises:
means for providing first and second addresses as the destination address;
means for obtaining the communication right upon receipt of the command with the destination address coinciding with said associated address; and
means for assigning the communication right, said assigning means being operable, in a case where said obtaining means obtained the communication right, to assign the communication right to one of a first node having an associated address coinciding with said first address and a second node having an associated address coinciding with said second address, and being operable to alternately change assignment of the communication right between said first node and said second node whenever a predetermined period of time has elapsed.

10. A network system according to claim 9, wherein said assigning means is adapted to assign the communication right by using plural commands of mutually different patterns respectively corresponding to said first and second addresses.

11. A network system according to claim 9, wherein said particular node transmits data prior to assignment of the communication right if a request for data transmission is present when the command is received.

12. A network system according to claim 9, wherein said providing means includes means for storing said first address and said second address.

13. A network system according to claim 9, wherein said plurality of nodes are bus-connected through said communication medium.

14. A network system according to claim 9, wherein said assigning means performs the assignment change of the communication right from one of said first node and said second node to another node when a predetermined time from a point of time when the communication right is assigned to said one of said first node and said second node has elapsed.

* * * * *

UNITED STATES PATENT AND TRADEMARK OFFICE
CERTIFICATE OF CORRECTION

PATENT NO. : 4,701,908
DATED : October 20, 1987
INVENTOR(S) : TOSHIO IKEDA

It is certified that error appears in the above-identified patent and that said Letters Patent is hereby corrected as shown below:

COLUMN 1

Line 59, "phsical" should read --physical--.

COLUMN 2

Line 30, "as" should read --an--.

COLUMN 3

Line 9, "or" should read --OR--.
    Line 21, "comparator" should read --comparators--.
    Line 62, "82," should read --S2,--.

COLUMN 4

Line 20, "formal" should read --format--.

COLUMN 7

Line 14, "coincide each" should read --coincide with each--.

COLUMN 8

Line 22, "specie" should read --species--.

UNITED STATES PATENT AND TRADEMARK OFFICE
CERTIFICATE OF CORRECTION

PATENT NO. : 4,701,908

DATED : October 20, 1987

INVENTOR(S) : TOSHIO IKEDA

It is certified that error appears in the above-identified patent and that said Letters Patent is hereby corrected as shown below:

COLUMN 9

Line 7, "assign" should read --for assigning--.

Signed and Sealed this

Fifth Day of April, 1988

Attest:

Attesting Officer

DONALD J. QUIGG

Commissioner of Patents and Trademarks